No. 867,710. PATENTED OCT. 8, 1907.
W. EICHERS.
WHEEL.
APPLICATION FILED JAN. 7, 1907.

WITNESSES

INVENTOR
WILLIAM EICHERS
BY Paul & Paul
HIS ATTORNEYS

UNITED STATES PATENT OFFICE.

WILLIAM EICHERS, OF MINNEAPOLIS, MINNESOTA.

WHEEL.

No. 867,710.

Specification of Letters Patent.

Patented Oct. 8, 1907.

Application filed January 7, 1907. Serial No. 351,063.

*To all whom it may concern:*

Be it known that I, WILLIAM EICHERS, of Minneapolis, Hennepin county, Minnesota, have invented certain new and useful Improvements in Wheels, of which the following is a specification.

My invention relates to wheels designed particularly for use on automobiles and other vehicles, and the object of the invention is to provide a wheel having a hub which will yield in any direction when the wheel strikes an obstruction, and take up the jar or shock and prevent it from being transmitted to the frame of the vehicle.

A further object is to simplify and reduce the expense of manufacture and maintenance of a vehicle wheel by providing a construction which will dispense with the ordinary tire.

The invention consists generally in various constructions and combinations, all as hereinafter described and particularly pointed out in the claims.

Figure 1:
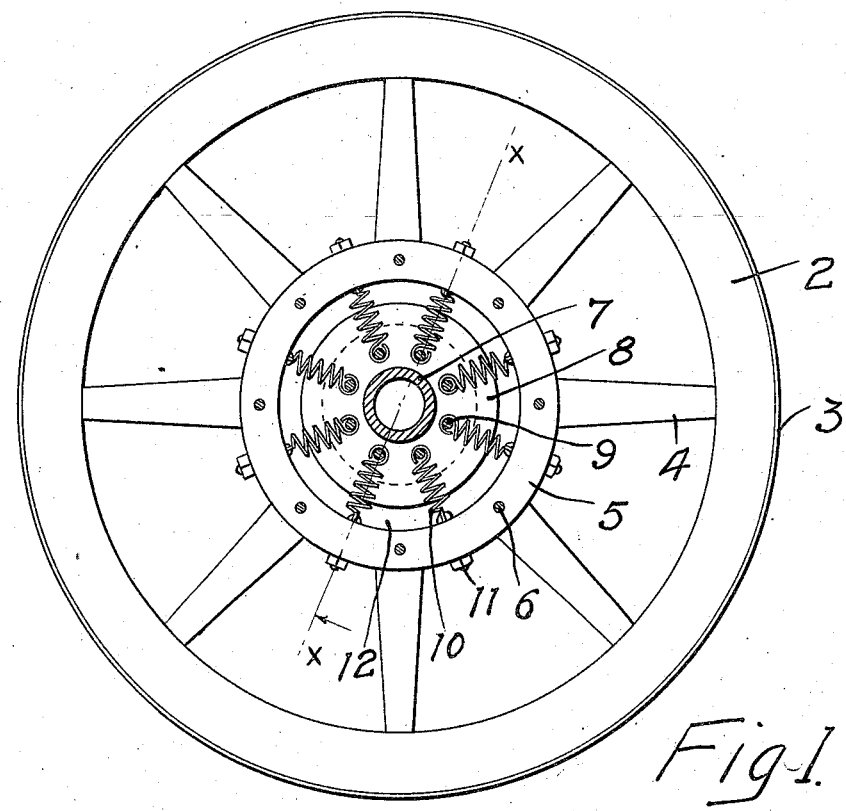
Figure 2:
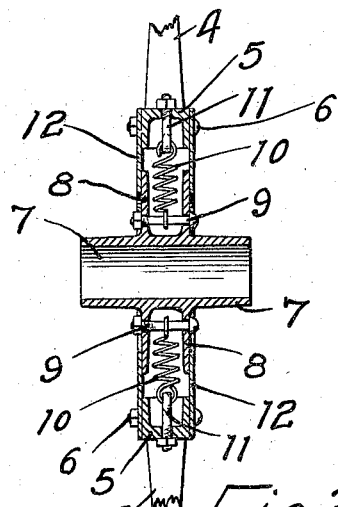
Figure 3:
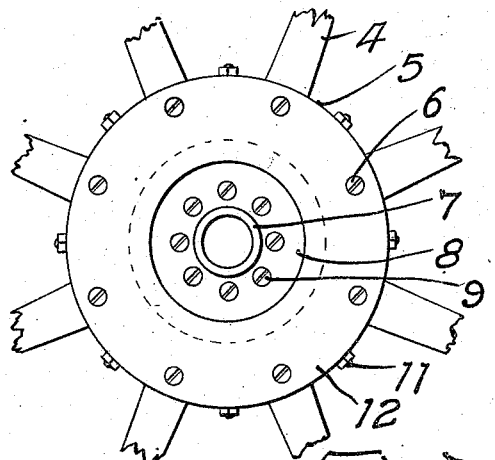

In the accompanying drawings, forming part of this specification, Figure 1 is a side elevation of a wheel embodying my invention partially in section showing the arrangement and construction of the hub. Fig. 2 is a sectional view on the line x—x of Fig. 1. Fig. 3 is a detail view showing the manner of mounting the hub at the inner ends of the blocks.

In the drawing, 2 represents the wheel rim having a metal tire 3 and a series of spokes 4 which radiate from a ring 5 that is concentric with the wheel and composed preferably of channel bar iron, with its open side toward the center of the wheel and its outer surface forming bearings for the ends of the spokes which are preferably secured by screws or bolts 6 that pass through the flanges of the ring and through the ends of the spokes.

7 is a wheel hub having annular parallel flanges 8 on each side of its center. Bolts 9 pass through these flanges and are connected by springs 10 with bolts 11 that are adjustably mounted in the ring 5 for the purpose of increasing or decreasing the tension of the springs. Plates 12 cover the space between the flanges 8 and the ring 5 and normally conceal the springs from view. The axle box fits within the hub 7 and the load will be carried thereby and the tension on the springs so regulated that any movement of the hub in either direction will be yieldingly resisted by the springs and any shock or jar transmitted from the rim of the wheel will be taken up by the springs. The ring 5 will have a sufficient sliding movement on the flanges 8 to allow the wheel to move up and down or forward and back, the springs on one side being extended to resist movement of the hub in one direction and those on the other side of the center being extended to resist its movement in the other direction. Whenever desired the tension of the springs may be varied according to the size of the wheel or the character of the vehicle and the load to be carried.

I claim as my invention:

1. A wheel comprising a rim and tire, a ring of channel bar iron concentric with said rim and having its flanges extending inwardly toward the said hub, a hub within said ring having outwardly extending annular flanges, the space between said flanges corresponding substantially to the width of said ring, bolts connecting said flanges, coiled springs having their inner ends connected to said bolts and their outer ends adjustably connected to said ring, and plates secured on the flanges of said ring and having sliding contact with the flanges on said hub, substantially as described.

2. A wheel comprising a rim and tire, a ring concentric with said rim, a hub within said ring having outwardly extending annular flanges, the space between said flanges corresponding substantially to the width of said ring, coiled springs having their inner ends attached at intervals to said flanges and their outer ends connected to said ring, and plates contacting with said flanges and with the edges of said ring and having a sliding movement on one of them, substantially as described.

3. A wheel comprising a rim and tire, a ring of channel bar iron concentric with said rim and having its flanges extending inwardly toward the center of the wheel, a hub within said ring having outwardly extending annular flanges, bolts connecting said flanges, coiled springs having their inner ends attached to said bolts and their outer ends connected to said ring, and plates contacting with said flanges and the edges of said ring and having a sliding bearing on one of them, substantially as described.

4. A wheel comprising a rim and tire, and a ring within said rim and concentric therewith, spokes having their ends rigidly secured to said ring and rim, a hub within said ring having outwardly extending flanges, coiled springs having their inner ends attached to said flanges, bolts connected to the outer ends of said springs and passing through said ring between said spokes and adjustable in said ring to regulate the tension of said springs, and plates arranged to contact with said ring and flanges, and having a sliding bearing on one of them.

In witness whereof, I have hereunto set my hand this 31st day of December 1906.

WILLIAM EICHERS.

Witnesses:
RICHARD PAUL,
J. B. ERA.